March 25, 1958 W. M. REESE 2,827,716
DIFFERENTIAL PRESSURE RESPONSIVE DEVICE
Filed June 28, 1956 3 Sheets-Sheet 1

INVENTOR
WILLIAM MAURICE REESE
BY
ATTORNEYS

March 25, 1958 W. M. REESE 2,827,716
DIFFERENTIAL PRESSURE RESPONSIVE DEVICE
Filed June 28, 1956 3 Sheets-Sheet 2
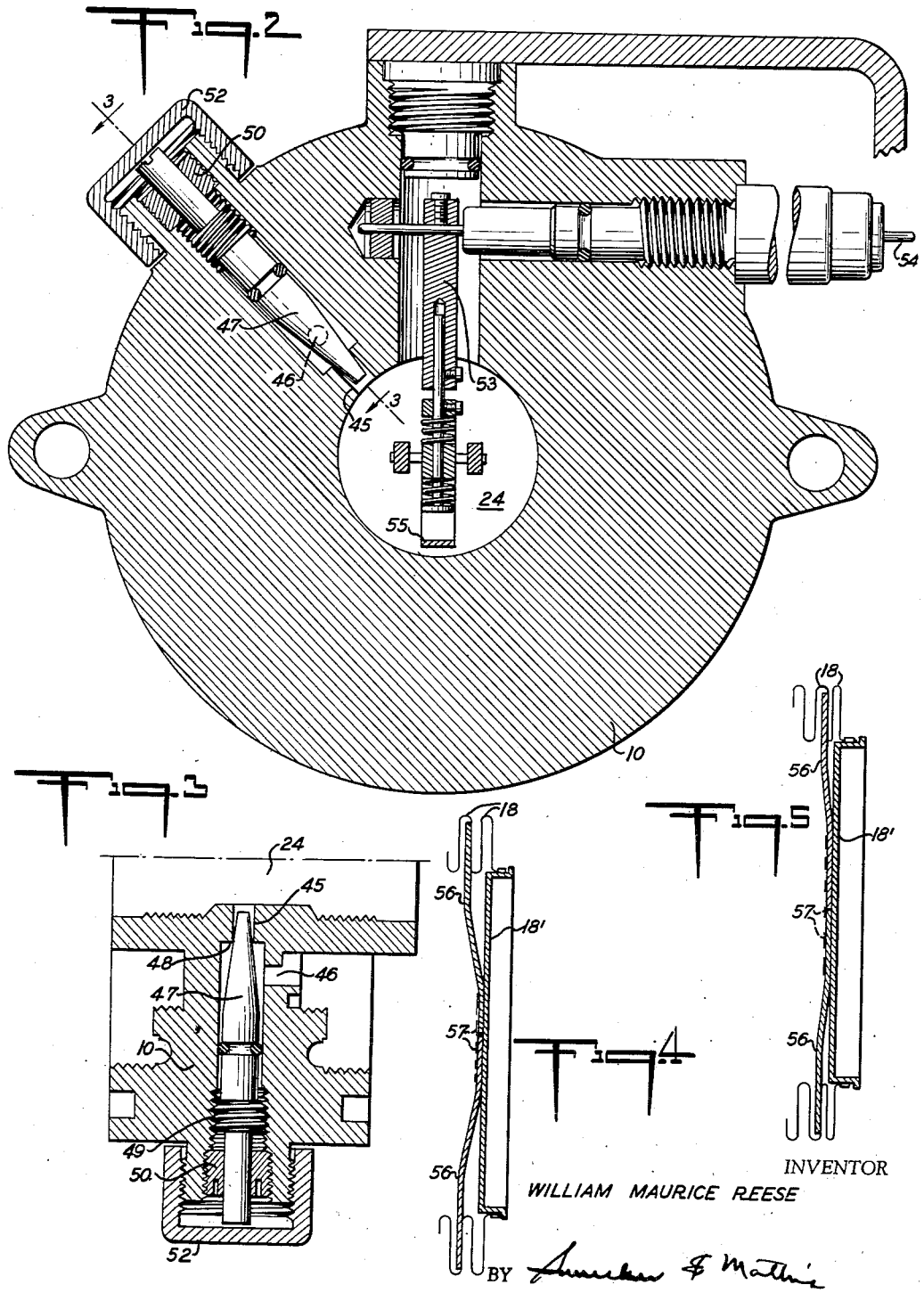
INVENTOR
WILLIAM MAURICE REESE
ATTORNEYS March 25, 1958   W. M. REESE   2,827,716
DIFFERENTIAL PRESSURE RESPONSIVE DEVICE
Filed June 28, 1956   3 Sheets-Sheet 3

INVENTOR
WILLIAM MAURICE REESE,

BY
ATTORNEYS

United States Patent Office 2,827,716
Patented Mar. 25, 1958

2,827,716

DIFFERENTIAL PRESSURE RESPONSIVE DEVICE

William M. Reese, Austin, Tex.

Application June 28, 1956, Serial No. 594,440

6 Claims. (Cl. 137—779)

This application is a continuation-in-part of my prior application, filed February 18, 1954, Serial No. 411,039, now Patent No. 2,762,391.

This invention relates to improvements in differential pressure responsive devices of the character used for measuring pressures in different environments such, for instance, as the drop in pressure through an orifice plate in a flow line or between separate chambers, and for other purposes.

It has been proposed heretofore to construct a differential pressure responsive device of the character described, which uses two opposed bellows mounted on a center plate and adapted for open communication with each other through a passageway controlled by suitable valves. The pressures to be measured are applied, respectively, to the exteriors of the two bellows, and the bellows move in response thereto, and one of these bellows controls the pressure responsive element such, for instance, as a meter, indicator, recorder or controller, etc.

The bellows normally are filled with an incompressible liquid which, nevertheless, is subject to expansion by variations in temperature. When the device is used in conditions where there may be a substantial fluctuation of temperature, the expansion or contraction of the liquid confined within the bellows may cause an erroneous action of the responsive instrument. However, some of the expansion or contraction is taken up by the free bellows, but under extreme conditions, a variation in the transmission of force may be produced in accordance with a substantial variation in temperature.

One object of this invention is to improve the construction of the differential pressure responsive device by compensating for variations in temperature that may be encountered, as affected by the expansion or contraction of the liquid in the instrument, which otherwise may produce an erroneous action of the responsive element.

A further object of the invention is to provide for expansion or contraction of the bellows by the action of temperature variations on the liquid enclosed therein to effect uniform indications or recordings without regard to variations in temperature.

Another object of the invention is to provide bimetallic means enclosed within one of the bellows and subjected to heat exchange relation with the liquid therein to cause an expansion or contraction of one or more of the convolutions of said bellows in response to variations in temperature acting on the liquid, thereby to effect and maintain uniform operation of the responsive element regardless of variations in temperature.

These objects may be accomplished, according to one embodiment of the invention, by providing a pair of bellows, one of which is free while the other is connected with a responsive device, such as a recorder or indicator. The bellows are filled with a liquid that flows back and forth therebetween in response to variations in pressure acting on the bellows. A bi-metallic member is enclosed in the free bellows, acting on one or more of the convolutions thereof in such manner as to cause expansion or contraction of said free bellows in response to such variations in temperature, without affecting the action of the liquid on the responsive device, thereby to maintain the accuracy of the instrument. Moreover, this provides for the setting of the instrument at absolute zero.

This embodiment of the invention is illustrated in the accompanying drawings in which:

Fig. 2 is a detailed cross section therethrough, substantially on the line 2—2 in Fig. 1;

Fig. 3 is a further cross section on line 3—3 in Fig. 2;

Fig. 4 is a longitudinal section through a portion of one of the bellows when subjected to high temperature;

Fig. 5 is a similar view, showing said bellows when subjected to low temperature;

While the invention is adapted for many uses as a differential pressure responsive device, for measuring, controlling or indicating pressure differentials, one embodiment of the invention is illustrated as a differential flow meter to measure the drop in pressure through an orifice plate in a flow line. A typical gas or liquid flow line is provided with an orifice plate therein. Connected with flow line on opposite sides of the orifice plate are pipes 3 and 4, respectively, which extend to the differential pressure responsive device constituting this invention, being connected, respectively, with the high and low pressure chambers thereof.

Figure 1:
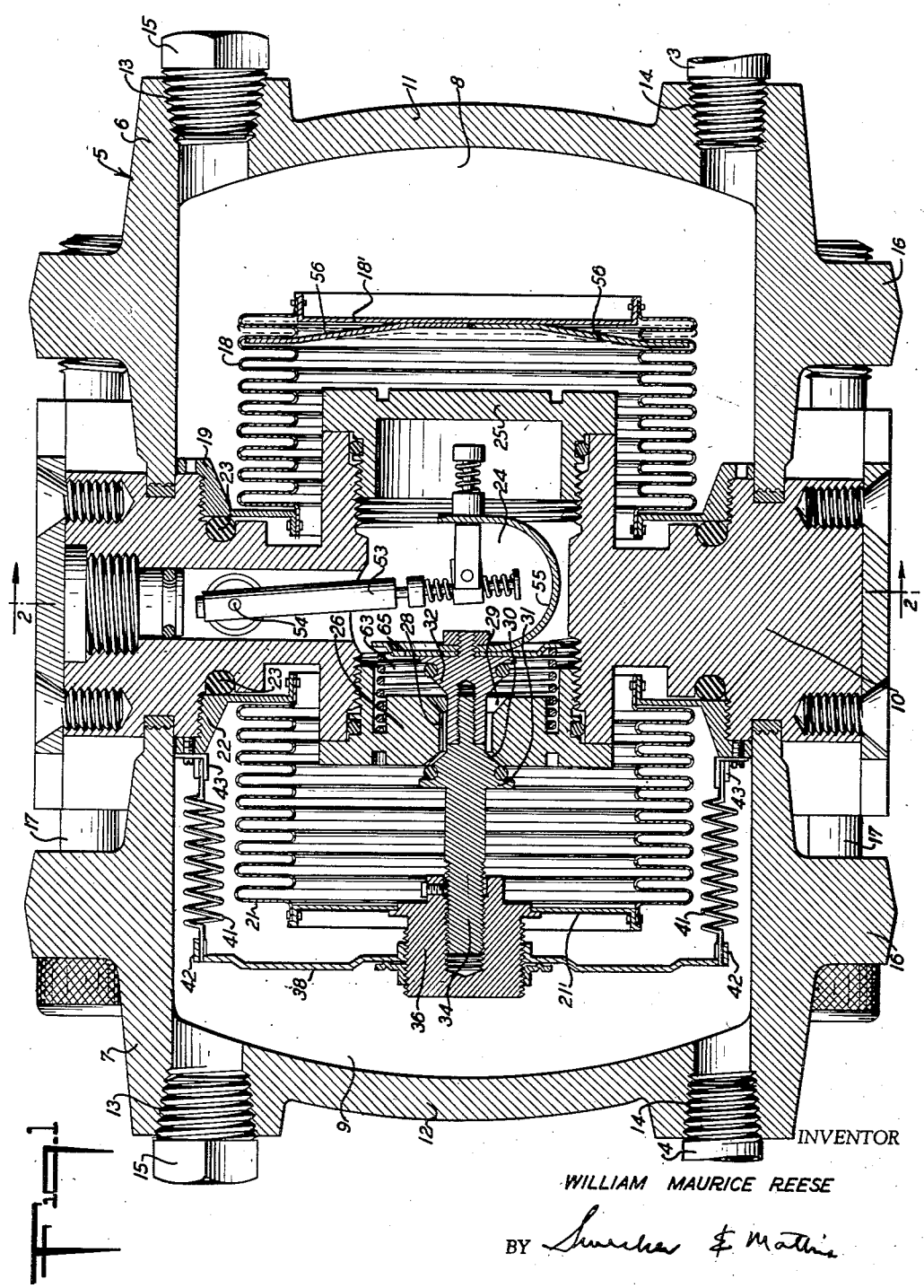
Fig. 1 is a longitudinal section through a differential pressure responsive device embodying this invention.
Figure 6:
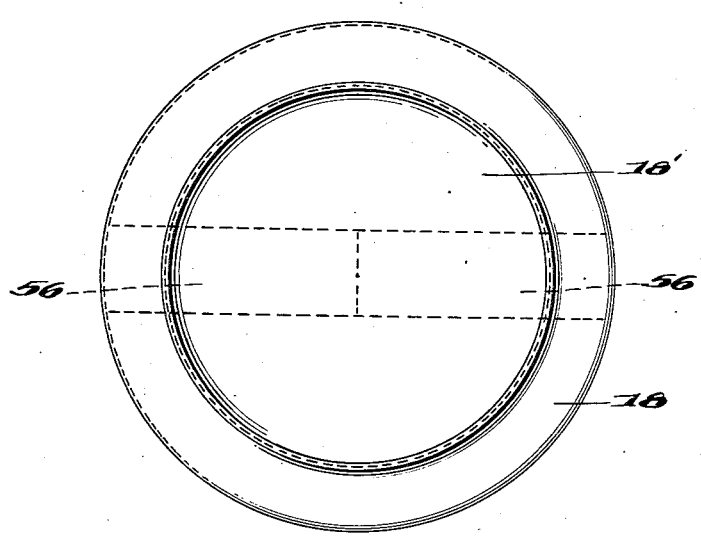
Fig. 6 is a top plan view of the bellows member shown in Fig. 1.
Figure 7:
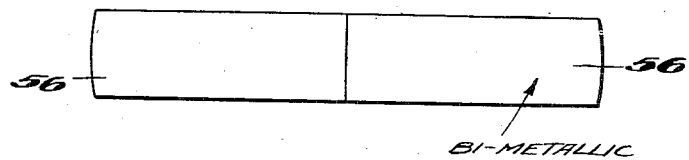
Fig. 7 is a plan view of the bi-metallic element 56.

The embodiment of this device which is illustrated in the drawings comprises a housing generally indicated at 5, the construction of which is shown in Fig. 1. The housing 5 includes a high pressure cylinder or body 6 and a corresponding low pressure cylinder or body 7 arranged in axial alignment with each other and enclosing, respectively, high and low pressure chambers 8 and 9. The chambers 8 and 9 are separated from each other by a center plate 10.

The housing cylinder or body 6 is closed at its outer end by a head 11, while the cylinder or body 7 is likewise closed at its outer end by a head 12. The heads 11 and 12 are shown as formed in one integral piece with the cylinders or bodies 6 and 7, respectively, although they may be separate therefrom if desired and secured rigidly thereto. Each of the heads 11 and 12 is provided with tapped connector openings 13 and 14 of the same or of different diameters as, for instance, one-quarter inch and one half inch, respectively. One set of the openings is connected with the pipes 3 and 4, while the other set is closed by plugs 15. Either set of tapped connector openings may be used according to the size of pipes to be connected therewith.

Each of the cylinders or bodies 6 and 7 is provided with radially disposed flanges or lugs 16 for connecting together the cylinders or bodies 6 and 7 through cap screws or tie bolts 17. Several such tie bolts may be used as required.

Mounted within the high pressure chamber 8 is a bellows 18 closed at its outer end by a plate 18' and exposed externally to the pressure within the high pressure chamber 8. The inner end of the bellows 18 is sealed to a nut 19 screw-threaded into a countersunk portion in the adjacent lateral face of the center plate 10. A sealing ring is shown at 23, preferably an O-ring, which effects a complete sealing from the inside of the bellows 18 around the periphery of the nut 19 into the chamber 8.

Mounted in the low pressure chamber 9 is a bellows 21 closed at its outer end by a plate 21', the periphery of which bellows is exposed to the pressure in the chamber 9. The inner end of the bellows 21 is sealed to a nut 22 screw-threaded into a recessed portion of the center plate 10 and provided with a peripheral seal at 23, corresponding with the connection at 19—23 described above.

The bellows 18 and 21 preferably have substantially equal effective areas and are both exposed externally to the liquid or gas within the chambers 8 and 9. The construction herein set forth provides for the use of larger bellows requiring several times the sealing fluid contained therein, which gives greater displacement with increased drive power. This provides several times the total calibrated travel as compared with other bellows heretofore used in instruments of this general type. The bellows 18 and 21 are filled with a suitable liquid that is adapted to flow back and forth in response to variations in pressure in the chambers 8 and 9.

The center plate 10 is provided with an axial passageway therethrough, formed with a cored out chamber 24. The axial passageway is closed by plugs 25 and 26 at opposite ends thereof, preferably screw-threaded into opposite sides of center plate 10 and sealed thereto. This plug 25 forms a cap over the chamber 24 at the adjacent side of the center plate 10 and closes the chamber 24 against direct open communication with the interior of the high pressure bellows 18.

The plug 26 has a passageway 28 therethrough provided with high and low pressure valve seats 29 and 30, respectively, at opposite ends of said passageway, adapted to be engaged alternatively by valves 31 and 32, respectively, on a valve stem 34. The valves 31 and 32 are fixed to each other with their opposed faces spaced apart a distance greater than the distance between the valve seats 29 and 30 so that only one of these valves will engage its seat at a time and both valves may be open at the same time, as illustrated in Fig. 1. O-ring seals may be provided in the faces of the valves 31 and 32 for sealing the valves against the seats 29 and 30, respectively, or any other sealing means desirable may be used for this purpose.

The valve stem 34 is carried by a plug 36 secured rigidly to a plate 38. At its inner end, the plug 36 is sealed to the end plate 21' of the bellows 21 and abuts in seated relation therewith.

The plate 38 normally is urged in an inward direction by range springs 41 spaced at intervals around the periphery of the low pressure bellows 21. Each of the range springs 41 is secured at one end to a peripheral ring connection 42 on the plate 38 and at its opposite end to a similar ring connection 43 secured to the adjacent lateral face of the nut 22 so as to extend parallel with the axis of the bellows 21 and normally tending to contract the latter and to move the valve 31 toward a closed or seated position.

The center plate 10 is provided with a by-pass passage (see Fig. 3) from the chamber 24 therein into the high pressure bellows 18. This by-pass passage is formed by a radial passage 45 in the center plate 10, open at one end to the chamber 24 and having a lateral outlet 46 into the high pressure bellows 18. These passages 45 and 46 will allow the free circulation of liquid from the chamber 24, which may be in open communication with the low pressure bellows 21, into the high pressure bellows 18.

This communication may be controlled by a pulsation dampener restriction valve 47 which is of the needle type, normally adjustable and adapted to engage a seat 48 intermediate the passages 45 and 46 to control the opening therebetween and communication therethrough. The valve 47 is adjustably mounted at 49 in the plate 10 and is held in place by a nut 50 screw-threaded into a projecting portion of the plate, as shown in Fig. 3. A cap 52 closes the outer end of the valve and is removable for access thereto.

This valve 47 is adapted to be seated in a predetermined position so as to permit normal flow of liquid from one bellows to the other, but to restrict excessive flow due to greatly increased pressures. The normal flow between the bellows is controlled by the valves 31 and 32, being moved in accordance with the relative pressures on the high and low pressure bellows 18 and 21.

The valve stem 34 is adapted for connection with an arm 53 which extends downwardly in the chamber 24 of the center plate 10 from a shaft 54 at its upper end. The shaft 54 extends through a non-freezing bearing of the type set forth in my prior Patent No. 2,712,968, dated July 12, 1955. The shaft 54 may be connected with any suitable indicator, recorder or other device, which it may be desirable to actuate in response to the differential of pressure connected with the chambers 8 and 9.

The bellows 18 and 21 normally are filled with an incompressible thermostatic liquid. Variations in temperature will affect the volume of the liquid and, in so far as the volume may increase or decrease, would likewise affect the position of the arm 53. While the free bellows 18 will compensate to a substantial extent for expansion or contraction of the liquid, provisions may be made for further compensation, so that any variations in temperature acting on the liquid in the bellows will not affect the absolute zero of the instrument connected therewith.

As set forth in my prior application Serial No. 411,039, filed February 18, 1954, I may use, if desired, a thermostatic element 55 connected between the valve stem 34 and the arm 53. This element 55 is shown as a bi-metallic bar, one end of which is connected with the valve stem and the other end has an operative connection with the arm. This bi-metallic member may be in the form of a U-shaped member, loop or the like, or of other desired character.

I have also found that it is desirable to vary the action of the free bellows in response to variations in temperature by means located within the free bellows in heat exchange relation with the liquid therein.

The free bellows 18 has a natural resiliency which causes a predetermined expansion thereof when the pressures on the inside and outside of said bellows are balanced evenly. The convolutions of the free bellows, in that event, would be spaced uniformly apart. Any variations in the pressures acting on the free bellows will change the spacing of the convolutions as a result of the expansion or contraction thereof under such changes in pressure.

Provision is made herein for varying the capacity of the free bellows 18 to accommodate for an increase or decrease in the volume of the incompressible liquid enclosed within the pair of bellows as a result of changes of temperature acting thereon. Thus, one or more of the convolutions at the free end of the free bellows 18 can be varied to effect this change of volume and yet allow for ready response of the bellows to changes in temperature.

This is accomplished, according to the embodiment of the invention shown in the drawings, by means of bi-metallic members 56 extending diametrically across the end wall 18' of the bellows 18 and of relatively narrow width, only sufficient to cause an expansion or contraction of the connected convolution of the bellows. While one bi-metallic member could be used, if bowed or of other suitable shape, I have found that a pair of members is preferable. These members 56 are shown as anchored at 57 to the center portion of the plate 18' as by spot welding, and have their outer ends engaged over one of the end convolutions of the bellows 18, between the folds of the latter. In this form, the bi-metallic members 56 are engaged in the second fold or convolution from the end of the bellows 18. When the liquid in the bellows is subjected to high temperature, the bi-metallic members 56 in heat exchange relation with the liquid, will be bowed sufficiently so as to cause the end convolutions to spread apart and thereby expand the capacity of the bellows to compensate for this increase in temperature without affecting the position of the low pressure bellows 21. On the other hand, when the liquid is subjected to a low temperature, the bi-metallic members 56 tend to straighten out in diametric alignment and thereby pull the end convolutions of the bellows together so as to decrease the capacity of the free bellows 18 to compensate for a reduction in volume in the liquid due to the decrease in temperature acting thereon, as illustrated in Fig. 5.

While the range springs 41 may be used alone and control the action of the valves 31 and 32 and the flow of liquid between the bellows 18 and 21, these range springs may not be required and may be omitted in other instances, especially where there is a low differential to be measured by the device. In that event, a tension spring 63 may be used, surrounding the projecting end of the valve stem 34 and interposed between the plug 26 and a plate 65 secured to the end of the valve stem. By the use of both the tension springs 41 and the coiled tension spring 63, a wide range of differentials may be accommodated, or suitable adjustments made in the spring tension applied to the valve stem as found desirable. Such tension spring is set forth and claimed in my prior application Serial No. 504,440, filed April 28, 1955.

In other respects, the construction and operation of this device is substantially the same as set forth in my prior applications Serial No. 323,885, filed December 3, 1952, now Patent No. 2,762,392; Serial No. 384,608, filed October 7, 1953, now Patent No. 2,762,393; and Serial No. 411,039, filed February 18, 1954, now Patent No. 2,762,391.

While the invention has been illustrated and described in one embodiment, it is recognized that variations and changes may be made therein without departing from the invention as set forth in the claims.

I claim:

1. In a differential pressure responsive device, a housing having pressure chambers therein, a bellows and additional means each having a portion exposed to said pressure chambers, said bellows and additional means enclosing a liquid, means operatively connected with the additional means and movable thereby in response to variations in pressure acting on the bellows, and thermostatic means located in the liquid in heat exchange relation therewith and connected with the bellows for varying the capacity thereof in response to variations in temperature acting on the liquid and on the thermostatic means, said bellows being free to move with respect to said additional means.

2. In a differential pressure responsive device, a housing having pressure chambers therein, a plurality of bellows having portions exposed to said pressure chambers and enclosing a liquid, means operatively connected with a first one of said bellows and movable thereby in response to variations in pressure acting on the bellows, and thermostatic means located within and connected with a second one of said bellows for varying the capacity of the latter in response to variations in the volume of the liquid, said second bellows being free to move with respect to said first bellows.

3. In a differential pressure responsive device, a housing having pressure chambers therein, bellows having portions exposed to said pressure chambers and enclosing a liquid, means operatively connected with one of the bellows and movable thereby in response to variations in pressure acting on the bellows, the other bellows being free and disconnected from said first-mentioned bellows for freedom of movement relative to the first-mentioned bellows, and thermostatic means connected with said free bellows in heat exchange relation with the liquid for varying the volume of the free bellows in response to variations in volume of the liquid by variation in temperature, said thermostatic means comprising one or more bi-metallic spring members connected with an end of the free bellows and engaging in intermediate convolution thereof for expanding or contracting one or more end convolutions of said free bellows in response to variations in temperature acting on the liquid.

4. In a differential pressure responsive device, a housing having pressure chambers therein, bellows having portions exposed to said pressure chambers and enclosing a liquid, means operatively connected with one of the bellows and movable thereby in response to variations in pressure acting on the bellows, the other bellows being free and disconnected from said first-mentioned bellows for freedom of movement relative to the first-mentioned bellows, and thermostatic means connected with said free bellows in heat exchange relation with the liquid for varying the volume of the free bellows in response to variations in volume of the liquid by variations in temperature, said thermostatic means including a thermally responsive member enclosed in the liquid in the free bellows and anchored to an end of the bellows, said member engaging an intermediate convolution of the free bellows spaced from the end thereof in position to expand and contract the end convolutions in response to said variations in temperature.

5. In a differential pressure responsive device, a housing having pressure chambers therein, a bellows and additional means each having a portion exposed to respective ones of said pressure chambers, said bellows and additional means enclosing a liquid, means operatively connected with the additional means and movable thereby in response to variations in pressure acting on the bellows, and thermostatic means located within the bellows in heat exchange relation with the liquid for varying the volume of the bellows in response to variations in volume of the liquid, said thermostatic means comprising bi-metallic spring means connected with an end of the bellows and engaging an intermediate convolution thereof for expanding or contracting a section of the bellows in response to variations in temperature of the liquid.

6. In a differential pressure responsive device, a housing having pressure chambers therein, a bellows and additional means each having a portion exposed to respective ones of said pressure chambers, said bellows and additional means enclosing a liquid, means operatively connected with the additional means and movable thereby in response to variations in pressure acting on the bellows and additional means, and thermostatic means located within the bellows in heat exchange relation with the liquid for varying the volume of the bellows in response to variations in volume of the liquid, said thermostatic means comprising a device secured to an end of the bellows and having means engaging an intermediate convolution of the bellows for expanding or contracting a section of the bellows in response to variations in temperature of the liquid.

References Cited in the file of this patent

UNITED STATES PATENTS

| | | |
|---|---|---|
| 2,300,810 | Robbins | Nov. 3, 1942 |
| 2,301,879 | Jenny | Nov. 10, 1942 |
| 2,590,324 | Jones | Mar. 25, 1952 |
| 2,659,390 | MacLea et al. | Nov. 17, 1953 |
| 2,763,450 | Hanna et al. | Sept. 18, 1956 |